(12) United States Patent
Hegde et al.

(10) Patent No.: US 8,489,797 B2
(45) Date of Patent: Jul. 16, 2013

(54) HARDWARE RESOURCE ARBITER FOR LOGICAL PARTITIONS

(75) Inventors: Yogesh L. Hegde, Bangalore (IN); Vijayaprasanna Laxmikanthappa, Bangalore (IN); Jorge R. Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 12/570,127

(22) Filed: Sep. 30, 2009

(65) Prior Publication Data

US 2011/0078488 A1 Mar. 31, 2011

(51) Int. Cl.
| | |
|---|---|
| *G06F 13/00* | (2006.01) |
| *G06F 5/00* | (2006.01) |
| *G06F 21/00* | (2006.01) |
| *G06F 11/00* | (2006.01) |

(52) U.S. Cl.
USPC .............. 710/316; 710/53; 711/6; 714/3

(58) Field of Classification Search
USPC ................ 710/53, 316; 711/6; 714/3
See application file for complete search history.

(56) References Cited

U.S. PATENT DOCUMENTS

| | | | |
|---|---|---|---|
| 7,546,386 B2 | 6/2009 | Arndt et al. | |
| 7,694,298 B2 * | 4/2010 | Goud et al. | 718/1 |
| 7,937,616 B2 * | 5/2011 | Armstrong et al. | 714/13 |
| 8,046,521 B2 * | 10/2011 | Takashige et al. | 711/6 |
| 8,086,903 B2 * | 12/2011 | Arndt et al. | 714/43 |
| 8,102,843 B2 * | 1/2012 | Pettey et al. | 370/362 |
| 2003/0037092 A1 * | 2/2003 | McCarthy et al. | 709/104 |
| 2003/0110205 A1 * | 6/2003 | Johnson | 709/104 |
| 2004/0158834 A1 * | 8/2004 | Ham et al. | 718/104 |
| 2004/0199632 A1 * | 10/2004 | Romero et al. | 709/226 |
| 2005/0097384 A1 * | 5/2005 | Uehara et al. | 714/1 |
| 2006/0064523 A1 | 3/2006 | Moriki et al. | |
| 2008/0082983 A1 * | 4/2008 | Groetzner et al. | 718/105 |
| 2008/0126579 A1 | 5/2008 | Corneli et al. | |
| 2008/0301487 A1 * | 12/2008 | Hatta et al. | 714/3 |
| 2009/0106586 A1 * | 4/2009 | Armstrong et al. | 714/13 |
| 2009/0164660 A1 | 6/2009 | Abrams | |
| 2010/0185823 A1 * | 7/2010 | De et al. | 711/153 |
| 2010/0229171 A1 * | 9/2010 | Yoshimura et al. | 718/1 |

* cited by examiner

*Primary Examiner* — Paul R Myers
*Assistant Examiner* — Christopher A Daley
(74) *Attorney, Agent, or Firm* — David Mims; Robert C. Rolnik

(57) ABSTRACT

A computer implemented method, data processing system, and apparatus for hardware resource arbitration in a data processing environment having a plurality of logical partitions. A hypervisor receives a request for a hardware resource from a first logical partition, wherein the request corresponds to an operation. The hypervisor determines the hardware resource is free from contention by a second logical partition. The hypervisor writes the hardware resource to a hardware resource pool data structure, as associated with the first logical partition, in response to a determination the hardware resource is free. The hypervisor presents the hardware resource to the first logical partition. The hypervisor determines that the operation is complete. The hypervisor release the hardware resource from a hardware resource pool, responsive to the determination that the operation is complete.

3 Claims, 5 Drawing Sheets

HARDWARE RESOURCE ARBITER FOR LOGICAL PARTITIONS

BACKGROUND OF THE INVENTION

1. Field of the Invention

The present invention relates generally to a computer implemented method, data processing system, and computer program product for integrating data processing systems having multiple hardware resources and multiple logical partitions (LPAR). More specifically, the present invention relates to a hypervisor mediating access to one or more hardware resources in a manner that the LPAR sends and receives signals relating to the hardware resource in a manner similar to communications direct to the hardware resource.

2. Description of the Related Art

Virtualization is the creation of logical substitutes for physical resources. The substitutes have the same functions and external interfaces as their physical counterparts, but differ in attributes, such as size, performance, and cost. These substitutes are called virtual resources, and their users are typically unaware of the substitution. Virtualization is commonly applied to hardware resources by combining multiple hardware resources into shared pools from which a logical partition (LPAR) receives virtual resources. A hardware resource is a device that is physical. Examples of hardware resources include Ethernet adapters, I/O controller, audio adapters, and the like. In contrast, a virtual resource is the interface of the physical resource as presented to a logical partition. With virtualization, a computer system administrator can make one hardware resource perform as if it were multiple virtual resources.

A key software component supporting virtualization is the hypervisor. A hypervisor is used to logically partition the hardware into pools of virtualized resources known as logical partitions. Such logical partitions are made available to client entities, for example, operating systems and applications. Each logical partition of the hypervisor is unable to access hardware resources of a second logical partition unless such hardware resources are reassigned by the hypervisor. A hypervisor is sometimes known as a hosting partition.

Within a logical partition, an operating system may be stored. An OS partition is a logical partition in which an operating system is stored and executes. An operating system is used to perform basic tasks such as controlling and allocating memory, prioritizing system requests, controlling input and output devices, facilitating networking, and managing file systems. Such tasks are limited to the extent that the hypervisor allocates hardware resources to the operating system. Such hardware resources include input-output devices, and file storage adapters, and the like.

In addition to hardware resources enumerated above, a hypervisor may allocate I/O adapters. An I/O adapter is a physical network interface that provides memory-mapped input/output interface for placing queues into physical memory and provides an interface for control information. Control information can be, for example, a selected interrupt to generate when a data packet arrives. A data packet is a formatted block of data carried by a computer or communication network. A core function of the I/O adapter is handling the physical signaling characteristics of the network media and converting the signals arriving from the network to logical values. Depending on the type of I/O adapter, additional functional layers of the Open Systems Interconnection (OSI) model protocol stack may be handled within the I/O adapter, for example, the data link layer functions and the network layer functions, among others. In contrast, higher-level communication functions may be performed by the operating system to which the I/O adapter is assigned, or by applications within the operating system.

Servers are particularly dependent on the operation of I/O adapters to accomplish the functions of a server. In addition to providing data to users across a network, servers can draw attacks by malicious and unauthorized people.

SUMMARY OF THE INVENTION

The present invention provides a computer implemented method, data processing system, and apparatus for hardware resource arbitration in a data processing environment having a plurality of logical partitions. A hypervisor receives a request for a hardware resource from a first logical partition, wherein the request corresponds to an operation. The hypervisor determines the hardware resource is free from contention by a second logical partition. The hypervisor writes the hardware resource to a hardware resource pool data structure, as associated with the first logical partition, in response to a determination that the hardware resource is free. The hardware resource pool data structure may be controlled by the hypervisor. The hypervisor presents the hardware resource to the first logical partition. The hypervisor determines that the operation is complete. The hypervisor releases the hardware resource from a hardware resource pool, responsive to the determination that the operation is complete.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
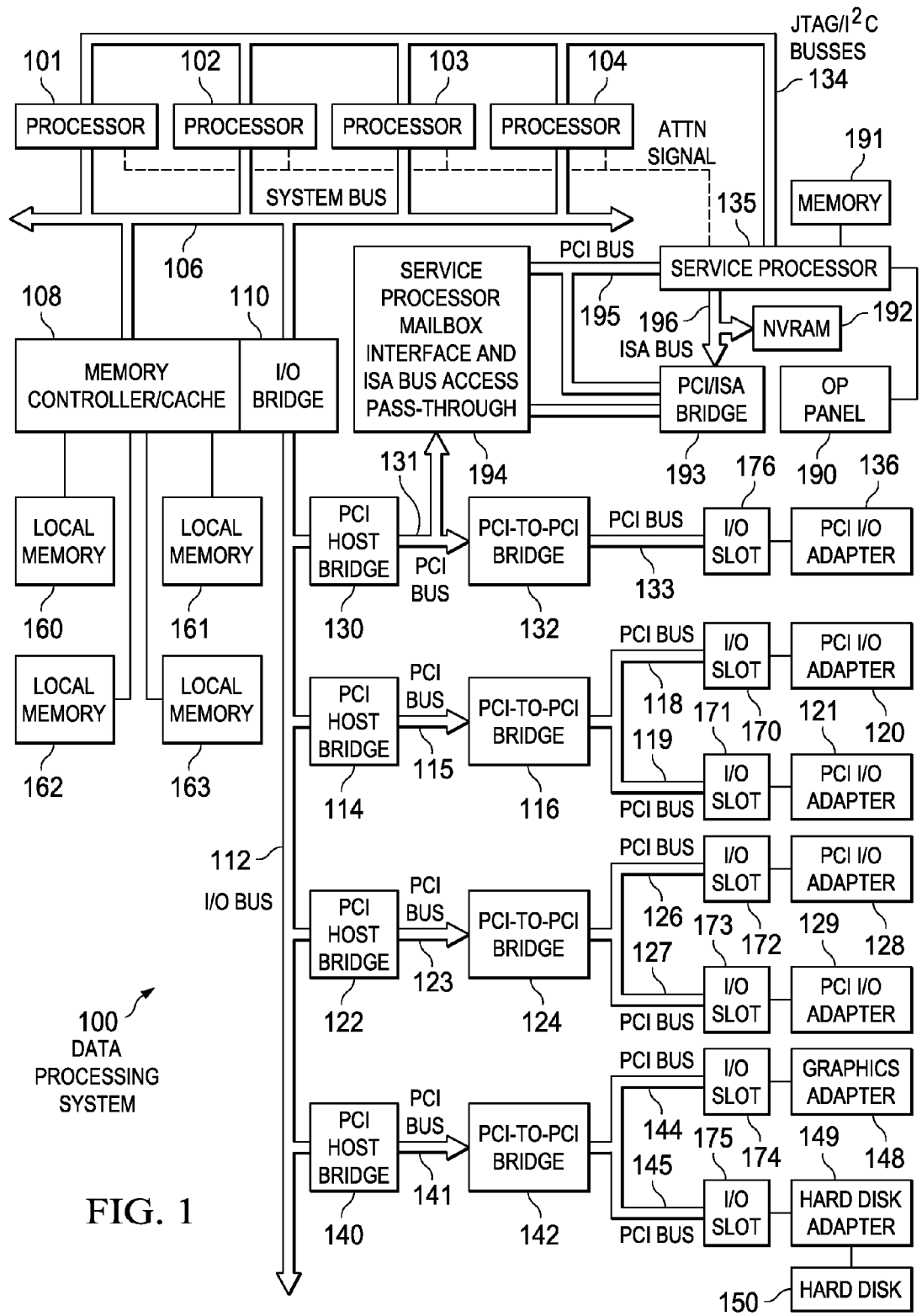
FIG. 1 is a data processing system in accordance with an illustrative embodiment of the invention.

FIG. 1 shows a block diagram of a data processing system in which illustrative embodiments of the invention may be implemented. Data processing system 100 may be a symmetric multiprocessor (SMP) system including a plurality of processors 101, 102, 103, and 104, which connect to system bus 106. For example, data processing system 100 may be an IBM eServer™, implemented as a server within a network. eServer is a registered trademark of International Business Machines Corporation in Armonk, N.Y. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects a display device (not shown), while hard disk adapter 149 connects to and controls hard disk 150.

Thus, for example, suppose data processing system 100 is divided into logical partitions of virtual I/O server, P1, P2, and P3. Each of PCI I/O adapters 120-121, 128-129, 136, graphics adapter 148, hard disk adapter 149, each of processors 101-104, and memory from local memories 160-163 can be assigned to each of the partitions. In these examples, local memories 160-163 may take the form of dual in-line memory modules (DIMMs). DIMMs are not normally assigned on a per DIMM basis to partitions. Instead, a partition will be assigned a portion of the overall memory seen by the platform. For example, processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units, which are assigned to its logical partition. Thus, for example, one instance of the Advanced Interactive Executive (AIX®) operating system may be executing within partition P1, a second instance or image of the AIX® operating system may be executing within partition P2, and a Linux® operating system may be operating within logical partition P3. AIX® is a registered trademark of International Business Machines Corporation. Linux® is a registered trademark of Linus Torvalds.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192, also known as non-volatile RAM, connects to the ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses, as defined by Institute for Electrical and Electronics Engineers standard 1149.1, and Philips I$^2$C busses. However, alternatively, JTAG/I$^2$C busses 134 may be replaced by only Philips I$^2$C busses or only JTAG/scan busses. All SP-ATTN signals of the processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local memories 160-163. Service processor 135 then releases processors 101-104 for execution of the code loaded into local memory 160-163. While processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other system resource for de-configuration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer iSeries Model 840 system available from International Business Machines Corporation. Such a system may support logical partitioning, wherein an OS/400® operating system may exist within a partition. OS/400 is a registered trademark of International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example does not imply architectural limitations with respect to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The aspects of the illustrative embodiments provide a computer implemented method, data processing system, and computer program product for hardware resource arbitration in a data processing system having a several logical partitions. The embodiments permit a device driver to be used in place of a virtual device driver where a hypervisor maintains ownership of each hardware resource. In addition, a virtual I/O server may virtualize each hardware in a hardware resource pool.

Figure 2:
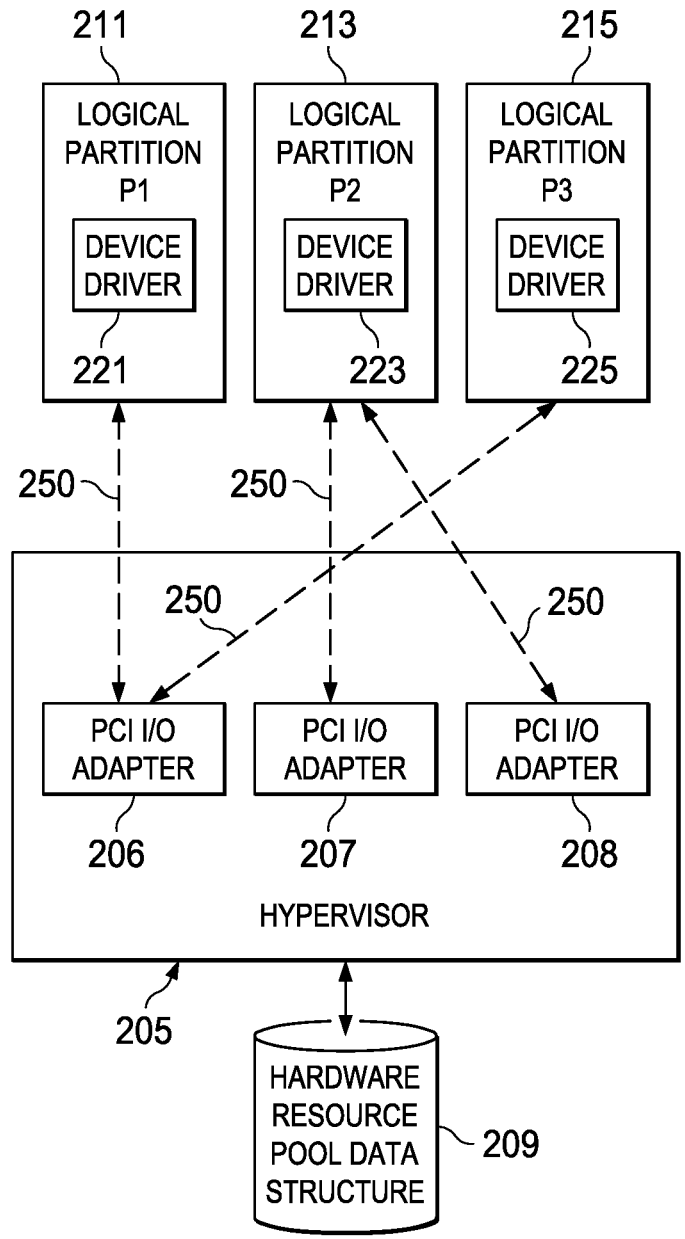
FIG. 2 is a block diagram of a hypervisor providing connections between logical partitions (LPARs) and hardware resources in accordance with an illustrative embodiment of the invention.

FIG. 2 is a block diagram of a hypervisor providing connections between logical partitions (LPARs) and hardware resources in accordance with an illustrative embodiment of the invention. A hypervisor is used to logically partition the hardware into pools of virtualized resources known as logical partitions. Hypervisor 205 may coordinate virtual I/O paths 250 to support access between each logical partition and the hardware resource pool. A virtual I/O path is a connection that is metered by the hypervisor to allow signals to travel between a processor executing computer instructions corresponding to a specific LPAR to a specific hardware resource. The hypervisor presents error signals to an endpoint of the connection during intervals that the connection is broken, but only one endpoint expects a response. A hardware resource pool is two or more hardware resources that are directly controlled by a hypervisor such that each hardware resource may be allocated asynchronously to a logical partition or client partition. A hypervisor may be a power hypervisor, for example, as implemented in an IBM eServer.

Although the hypervisor may assign a hardware resource to a logical partition (LPAR), the hypervisor controls such assignment, and accordingly owns the hardware resource. Illustrative embodiments may show a re-allocation assignment of a hardware resource between contending partitions. Hypervisor 205 can provide I/O to the LPARs in a manner to emulate the physical signals of each virtual resource. Accordingly, each logical partition, P1 211, P2 213 and P3 215, relies on their respective device drivers, device driver 211, device driver 213, and device driver 215. A device driver is a processor executing computer instructions to interface a higher-level computer program to a hardware device. The device driver adapts non-uniform hardware architectures into a set of features that, by convention, permit interchangeable higher-level computer programs to access functionality of the hardware. As such, the device driver acts as an abstraction layer between a hardware device and an LPAR. Accordingly, hardware manufacturers, having an appropriate device driver performing as an intermediary, are able to provide devices that can work with a wide range of partitions organized by varying operating systems.

In contrast, a virtual device driver is a program that responds to software interrupts from an LPAR partition. The software interrupts correspond to requests and responses to data traversing a physical resource. The software interrupt occurs in response to an instruction executed on a processor, which can cause a context switch to occur. A further distinction between a virtual device driver and a device driver is that a virtual device driver is written specifically to interact with a virtual I/O path in the Hypervisor, while a physical device driver interacts directly with the hardware itself.

In order to coordinate the allocation of a hardware resource to an LPAR, the hypervisor stores current hardware resource assignments to hardware resource pool data structure 209. A hardware resource pool data structure establishes assignments of a hardware resource to a partition, and may also assign a priority to the assignment. The hardware resource pool data structure is controlled by the hypervisor. Moreover, the hardware resource pool data structure may have multiple LPARs assigned to a hardware resource. If multiple LPARs are assigned a hardware resource, the hypervisor may alternate connections between a first LPAR and a second LPAR according to a priority assignment value. A priority assignment value is a proportionate amount of time to which a device is entitled full, though indirect, control of a hardware resource. Such a proportion may be in relation to a period of time during which a hardware resource may be shared among LPARs. A proportion for an LPAR may be assigned by taking into account the number of LPARs contending for the device, as well as the relative priority assigned to each LPAR.

Figure 3:
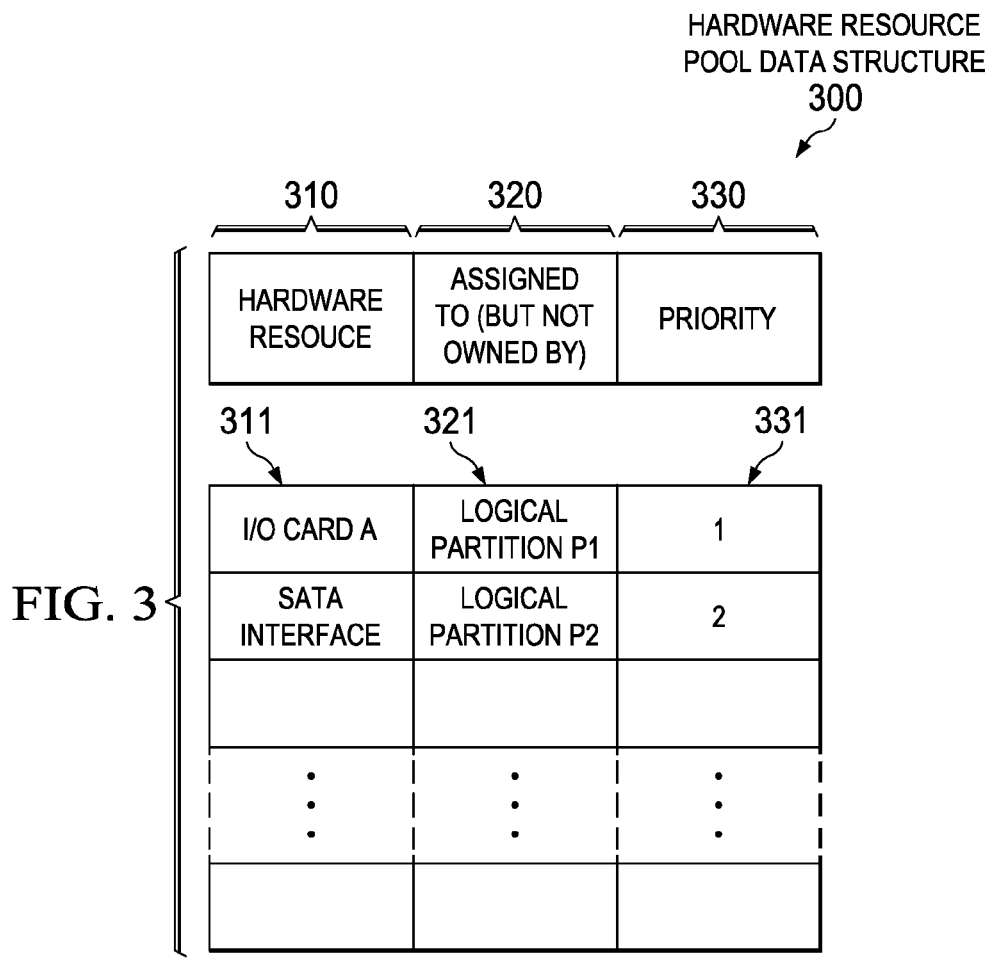
FIG. 3 is a hardware resource pool data structure populated in accordance with an illustrative embodiment of the invention.

FIG. 3 is a hardware resource pool data structure populated in accordance with an illustrative embodiment of the invention. Hardware resource pool data structure 300 may be arranged as a table having rows and columns. Hardware resource column 310 stores the identity of a hardware resource in the data processing system. The hardware resource can be, for example, hard disk adapter 149 of FIG. 1. Logical partition (LPAR) assignment column 320 stores the identity of the LPAR, which is assigned at least some time to use the corresponding hardware resource. The assignment or association is an indication of use and does not transfer the ownership of the hardware resource from one LPAR to another. Priority column 330 stores the priority of the assignment of an LPAR to a hardware resource. For example, a first row assigns I/O card A 311 to logical partition P1 321. In addition, the same row specifies that the priority of the assignment is 1 331. A priority may be one of several levels. Accordingly, a priority of 1 may be used to assign a greater priority assignment value of a hardware resource to the corresponding LPAR as compared to a priority of 2.

Figure 4:
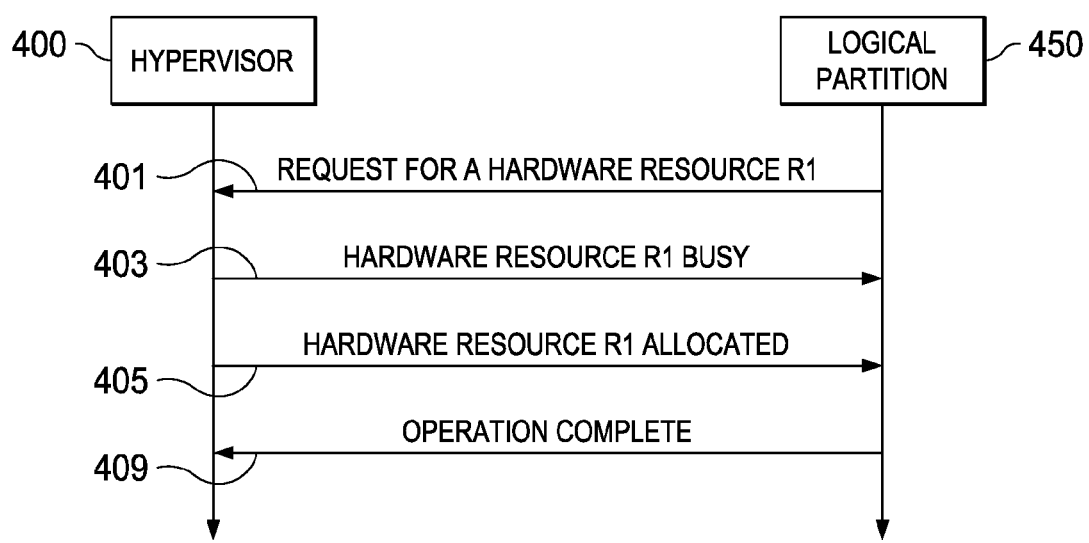
FIG. 4 is a block diagram of the communications between a hypervisor and a logical partition (LPAR) in accordance with an illustrative embodiment of the invention.

FIG. 4 is a block diagram of the communications between a hypervisor and a logical partition (LPAR) in accordance with an illustrative embodiment of the invention. The diagram shows the passage of time from earlier at the top, to later at the bottom. Accordingly, timelines extend from hypervisor 400 and from logical partition 450. Hypervisor 400 interacts with logical partition 450 to define the communications and the responses to those communications before during and after assigning a hardware resource to the LPAR. Initially, the LPAR sends a request for a hardware resource, R1, 401 to the hypervisor. The hypervisor may respond with one of two signals, namely, hardware resource R1 is busy 403, or hardware resource R1 is allocated 405. If the former, the hypervisor can signal an error to the logical partition. If the latter, the hypervisor may indicate an acknowledgement that the hardware resource is available as well as provide parameters concerning the availability.

In the instance where the hypervisor responds that the hardware resource is busy, the error may be one that is typical in an environment where a partition has exclusive access to the hardware resource. An error is a signal or message that reports that a secondary state has occurred with respect to a target device. The secondary state is a sub-optimal state that can indicate a lower level of functionality than an optimal state. For example, an error when requesting read access to a hard drive may be a signal that indicates that the hard drive, or target device, is busy. Another error may be that which occurs when the transfer queue is full—namely dropping a packet. In contrast, an optimal state for the hard drive may include a signal that includes an acknowledgment or a buffer or other stream containing data retrieved from the hard drive. Such a signal may be transmitted within hardware resource R1 allocated 405.

In each case above, signals sent to the logical partition 450 are processed by the device driver that operates within the logical partition. Similarly, the signals sent to hypervisor 400 are sent from the device driver. In other words, the code of the device driver executing on the processor sends and receives signals in response to asynchronous events outside the LPAR, and responsive to software interrupts from within the LPAR. Accordingly, each such resource communication, as well as the communications of the data accessed thereby, are handled by a device driver that is not a virtual device driver.

Figure 5:
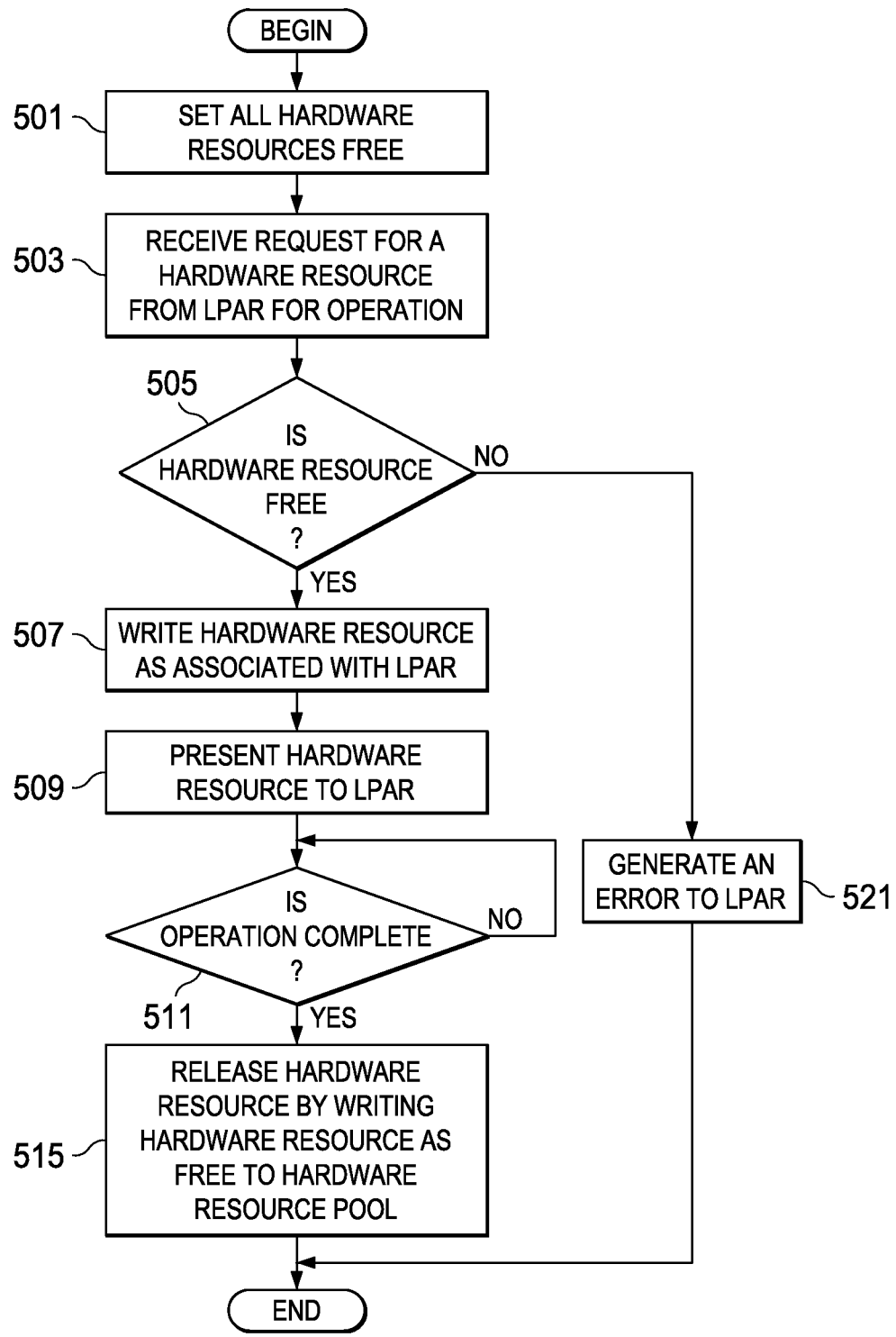
FIG. 5 is a flowchart of a method of a data processing system responding to requests for hardware resource assignment from a logical partition (LPAR) in accordance with an illustrative embodiment of the invention.

FIG. 5 is a flowchart of a method by which a data processing system may perform when responding to requests for hardware resource assignment from an LPAR in accordance with an illustrative embodiment of the invention. Initially, a hypervisor may set all hardware resources free (step 501). Setting all hardware resources free may itself be responsive to initializing the data processing system as may occur, for example, upon power up, or rebooting. Next, the hypervisor may receive a request for a hardware resource from an LPAR for and operation (step 503). An operation is a system call to a hardware resource. The system call can be an input/output system call.

Next, the hypervisor may determine whether the hardware resource is free (step 505). If the hardware resource is not free, a negative result occurs. Accordingly, the hypervisor may generate an error to LPAR (step 521). Processing may terminate thereafter.

Alternatively, the hypervisor may reach a positive result to step 505. Accordingly, the hypervisor may write the hardware resource as being associated with the LPAR (step 507). This step can include writing a row to a hardware resource pool data structure, such as hardware resource pool data structure 300 of FIG. 3. Next, the hypervisor may present the hardware resource to the LPAR (step 509). Presenting the hardware resource can include sending a hardware resource allocated signal (step 509). For example, the presenting may be of, for example, hardware resource R1 allocated 405 of FIG. 4. Next, the hypervisor may determine whether the operation is complete (step 511). Step 511 can be performed either by polling the LPAR, or by awaiting an asynchronous indication from the LPAR that the operation is complete. It is appreciated that other methods may be used for determining whether the operation is complete. Accordingly, negative determinations that the operation is complete may cause step 511 to iterate until the operation is complete.

Responsive to the operation completing, the hypervisor may release the resource by writing the hardware resource as free to the resource pool (step 515). Processing may terminate thereafter.

Figure 6:
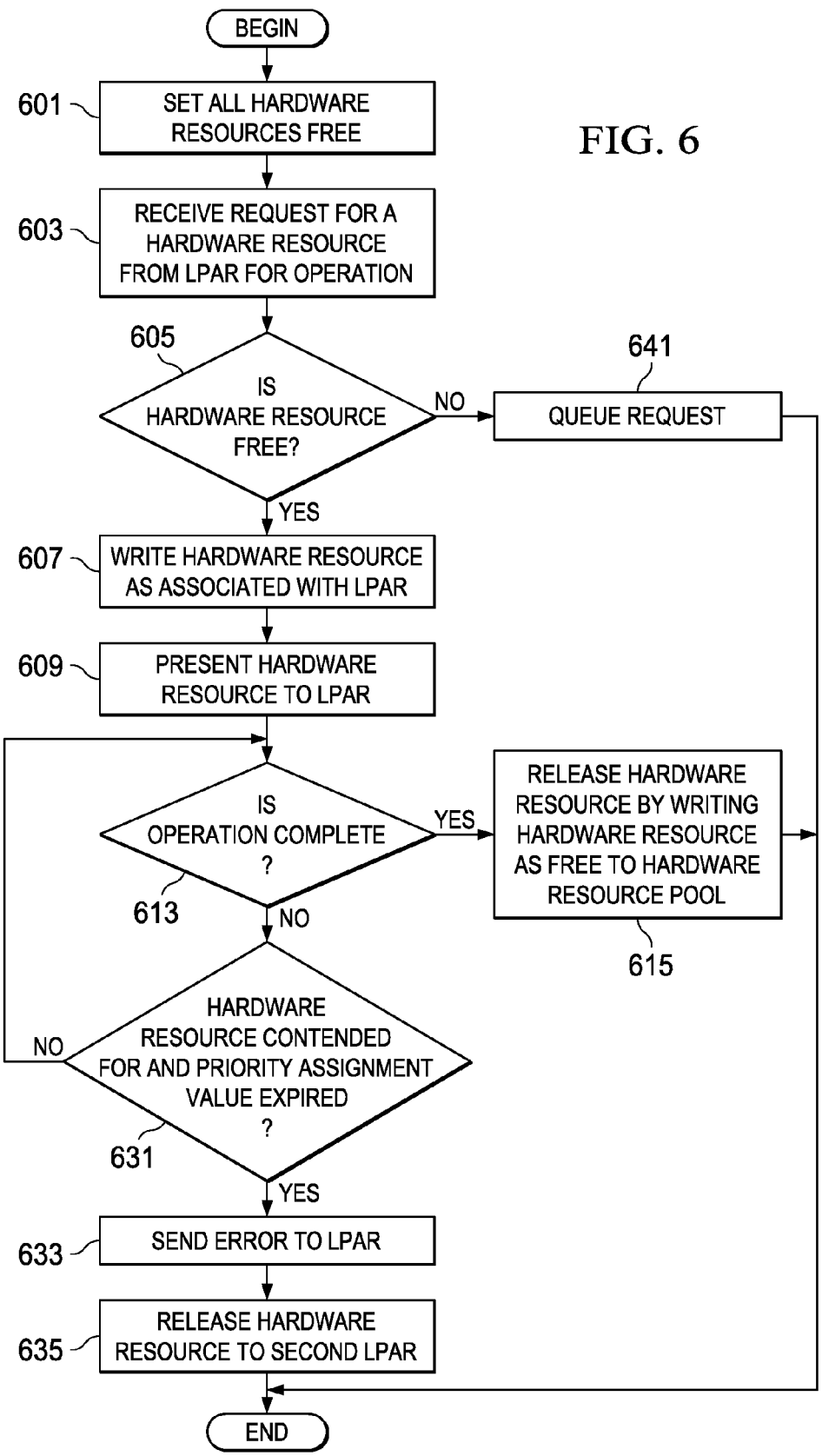
FIG. 6 is a flowchart of an alternative method that a data processing system may perform responding to requests for hardware resource assignment from a logical partition (LPAR) in accordance with an illustrative embodiment of the invention.

FIG. 6 is an alternative flowchart that a data processing system may perform, in response to requests for hardware resource assignment to an LPAR, in accordance with an illustrative embodiment of the invention. Initially, the hypervisor may set all hardware resources free (step 601). Next, the hypervisor may receive a request for a hardware resource from an LPAR for an operation (step 603). Next, the hypervisor may determine whether the hardware resource is free (step 605). If the hardware resource is not free, the hypervisor may queue request (step 641). The queue may be a data structure that the hypervisor checks from time to time to determine if a particular hardware resource has a contention for use, and which among the LPARs may be contending for the hardware resource. Processing may terminate thereafter.

If the hardware resource is free, the hypervisor may write the hardware resource as associated with LPAR (step 607). Next, the hypervisor may present the hardware resource to the LPAR (step 609). Attendant with presenting the hardware resource to the LPAR, the hypervisor may initiate a timer to detect if a priority assignment value has expired with relation to the hardware resource/LPAR assignment, providing the hardware resource is contended for by a second LPAR. The hypervisor may continue by determining if the operation is complete (step 613). Responsive to the operation completing, the hypervisor may release the hardware resource by writing the hardware resource as free to the hardware resource pool (step 615). Processing may terminate thereafter.

A negative result at step 613 can cause the hypervisor to determine if the requested hardware resource is contended for and whether a priority assignment value has expired (step 631). The priority assignment value, explained above, corresponds to a priority assignment value corresponding to the hardware resource/LPAR assignment. Step 631 is performed with reference to a priority assignment value, e.g., "1" 331 of FIG. 3. If either of the conditions at step 631 is false, the hypervisor re-iterates step 613. However, a positive result at step 631 may cause the hypervisor to send an error to the LPAR (step 633). Next, the hypervisor may release the hardware resource to a second LPAR (step 635). Processing may terminate thereafter.

At steps 509, 515, 521 (of FIG. 5), along with steps 609, 633, 635, and 641, the hypervisor behaves in a manner to emulate the hardware resource requested in steps 503 and/or 603 of FIGS. 5 and 6, respectively. Accordingly, a device driver from a manufacturer requires no additional software components within the LPAR to access/interface the LPAR to the hardware resource.

The illustrative embodiments permit software developers and/or system integrators working with a virtualized environment to assemble program loads of operating systems and device drivers to pair hardware resources to the LPARs without resorting to authoring, installing, initializing and otherwise maintaining a specialty virtual device driver for each device used as a hardware resource in the data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for resource arbitration in a data processing environment having a plurality of logical partitions, the computer implemented method comprising:
    receiving a request for a hardware resource from a first logical partition, wherein the request corresponds to an operation;
    determining that the hardware resource is free from contention by a second logical partition;
    responsive to a determination that the hardware resource is free, writing to a hardware resource pool data structure the hardware resource as associated with the first logical partition, wherein the hardware resource pool data structure is controlled by a hypervisor;
    presenting the hardware resource to the first logical partition;
    determining that the operation is complete;
    responsive to the determination that the operation is complete, releasing the hardware resource from a hardware resource pool; and
    recording all hardware resources as free before receiving the request for the hardware resource.

2. A computer program product for hardware resource arbitration in a data processing environment having a plurality of logical partitions, the computer program product comprising:
    computer readable program code configured to receive a request for a hardware resource from a first logical partition, wherein the request corresponds to an operation;
    computer readable program code configured to determine that the hardware resource is free from contention by a second logical partition, wherein a hardware resource pool data structure is controlled by a hypervisor;
    computer readable program code configured to write to the hardware resource pool data structure the hardware resource as associated with the first logical partition, responsive to a determination that the hardware resource is free;
    computer readable program code configured to present the hardware resource to the first logical partition;
    computer readable program code configured to determine that the operation is complete;
    computer readable program code configured to release the hardware resource from the hardware resource pool, responsive to the determination that the operation is complete; and
    computer readable program code configured to record all hardware resources as free before receiving the request for the hardware resource.

3. A data processing system comprising:
    a bus;
    a storage device connected to the bus, wherein computer usable code is located in the storage device;
    a communication unit connected to the bus; and
    a processor connected to the bus, wherein the processor executes the computer usable code for arbitration in a data processing environment having a plurality of logical partitions; the processor further executes the computer usable code to receive a request for a hardware resource from a first logical partition, wherein the request corresponds to an operation; determine that the hardware resource is free from contention by a second logical partition, wherein a hardware resource pool data structure is controlled by a hypervisor; write to the hardware resource pool data structure the hardware resource as associated with the first logical partition, responsive to a determination that the hardware resource is free; present the hardware resource to the first logical partition; determine that the operation is complete; release the hardware resource from the hardware resource pool, responsive to the determination that the operation is complete; and record all hardware resources as free before receiving the request for the hardware resource.

* * * * *